(12) United States Patent
Barrett et al.

(10) Patent No.: US 8,062,081 B2
(45) Date of Patent: Nov. 22, 2011

(54) HYBRID PROPULSION SYSTEMS

(75) Inventors: John Barrett, Leavenworth, WA (US); Elizabeth Boyd (nee Reynolds), Seattle, WA (US); Tim Stewart, Longview, WA (US); Rick McKenna, Seattle, WA (US); Jason Aspin, Charlottetown (CA); John Eldridge, Chamcook (CA); Paul Jamer, Fall River (CA); John Stratton, Bedford (CA); Chris Wright, Collingwood (CA)

(73) Assignee: Foss Maritime Company, Inc., Seattle, WA (US)

(*) Notice: Subject to any disclaimer, the term of this patent is extended or adjusted under 35 U.S.C. 154(b) by 0 days.

(21) Appl. No.: 12/334,412

(22) Filed: Dec. 12, 2008

(65) Prior Publication Data

US 2009/0156068 A1 Jun. 18, 2009

Related U.S. Application Data

(60) Provisional application No. 61/013,113, filed on Dec. 12, 2007.

(51) Int. Cl.
*B63H 21/22* (2006.01)
(52) U.S. Cl. ................................. 440/1; 440/6
(58) Field of Classification Search ............ 440/1, 6
See application file for complete search history.

(56) References Cited

U.S. PATENT DOCUMENTS

| | | | |
|---|---|---|---|
| 3,783,795 A * | 1/1974 | Helmer | 105/61 |
| 5,471,125 A | 11/1995 | Wu | |
| 5,616,056 A * | 4/1997 | Meissner | 440/3 |
| 5,991,683 A | 11/1999 | Takaoka et al. | |
| 6,064,161 A | 5/2000 | Takahara et al. | |
| 6,150,776 A | 11/2000 | Potter et al. | |
| 6,170,587 B1 | 1/2001 | Bullock | |
| 6,619,223 B2 | 9/2003 | Beato | |

(Continued)

FOREIGN PATENT DOCUMENTS

GB 2 290 281 A 12/1995

(Continued)

OTHER PUBLICATIONS

Loibner, Dieter "Hibrid Propulsion Quietly Gains Steam," http://www.soundingsonline.com/ME2/Segments/Publications, pp. 1-3 (Nov. 2008).

(Continued)

*Primary Examiner* — Stephen Avila
(74) *Attorney, Agent, or Firm* — Ann W. Speckman; Speckman Law Group PLLC

(57) ABSTRACT

A hybrid propulsion and energy management system for use in marine vessels and other variable demand propulsion applications monitors and draws energy from various energy sources dynamically to implement multiple operating modes and provide efficient system operation across a range of propulsive demands, altering the operation and output of various energy sources in response to propulsive load demands, hotel loads and auxiliary energy demands. The propulsion system incorporates at least two propulsive sources, including at least one main propulsive engine and at least one motor-generator unit arranged to drive a common output shaft, and the energy management system dynamically shifts operation of each of the two sources to satisfy propulsive demands. The main propulsive engine and the motor-generator unit are capable of driving the common output shaft both independently and simultaneously. The motor-generator unit(s) are available to operate either as a motor driving the output shaft or as a generator supplying energy to the energy distribution system.

30 Claims, 9 Drawing Sheets

U.S. PATENT DOCUMENTS

| | | | |
|---|---|---|---|
| 6,644,427 | B2 | 11/2003 | Schulte |
| 6,688,927 | B2 | 2/2004 | Aarnivuo |
| 6,752,670 | B2 | 6/2004 | Geil |
| 6,994,602 | B2 | 2/2006 | Ries |
| 7,018,249 | B2 | 3/2006 | Ries et al. |
| 7,121,905 | B2 | 10/2006 | Rzadki |
| 7,122,979 | B2 | 10/2006 | Wilton et al. |
| 7,124,691 | B2 | 10/2006 | Donnelly et al. |
| 7,207,852 | B2 | 4/2007 | Myers |
| 7,217,205 | B2 * | 5/2007 | Frank ............... 474/28 |
| 7,228,206 | B2 | 6/2007 | Kahle et al. |
| 7,241,192 | B2 | 7/2007 | Andersen et al. |
| 7,304,445 | B2 | 12/2007 | Donnelly |
| 7,335,072 | B2 | 2/2008 | Rzadki et al. |
| 7,349,797 | B2 | 3/2008 | Donnelly et al. |
| 7,391,129 | B2 | 6/2008 | Chiao et al. |
| 2002/0144848 | A1 | 10/2002 | Schulte |
| 2006/0071630 | A1 | 4/2006 | Dame et al. |
| 2006/0113127 | A1 * | 6/2006 | Dong et al. ............ 180/65.1 |
| 2006/0266256 | A1 * | 11/2006 | Donnelly et al. ......... 105/61 |
| 2007/0012494 | A1 * | 1/2007 | Ibenthal et al. .......... 180/65.3 |
| 2007/0035263 | A1 | 2/2007 | Rastogi et al. |
| 2007/0219683 | A1 | 9/2007 | Daum et al. |
| 2008/0082223 | A1 | 4/2008 | Daum et al. |
| 2008/0125924 | A1 | 5/2008 | Daum et al. |
| 2008/0133077 | A1 | 6/2008 | Akaki et al. |
| 2008/0147295 | A1 * | 6/2008 | Sivasubramaniam et al. ................ 701/103 |
| 2008/0182466 | A1 | 7/2008 | Wegner-Donnelly et al. |
| 2008/0195269 | A1 | 8/2008 | Lacy et al. |
| 2008/0201019 | A1 | 8/2008 | Kumar et al. |
| 2009/0095549 | A1 * | 4/2009 | Dalum et al. ........... 180/65.265 |

FOREIGN PATENT DOCUMENTS

| | | |
|---|---|---|
| WO | 00/73100 A1 | 12/2000 |
| WO | 2006/125184 A1 | 11/2006 |
| WO | 2007/002187 A2 | 1/2007 |
| WO | 2007/060244 A2 | 5/2007 |
| WO | 2007/143850 A1 | 12/2007 |
| WO | 2008/089571 A1 | 7/2008 |
| WO | 2008/009370 A1 | 8/2008 |

OTHER PUBLICATIONS

Ueda, Naoki et al., "The First Hybrid CRP-POD Driven Fast ROPAX Ferry in the World," Journal of the JIME, vol. 40, No. 2 (2005).

STEYRMOTORS, "STEYR MOTERS GmbH Wins DAME Award 2008," Press Release (Nov. 19, 2008).

Maritime Capital Solutions LLC, "Hybrid Power System," www.maritimecapitalsolutions.com, Press Release.

RiverQuest, "World's First Green-Designed Passenger Boat Departs Florida for Educational Mission in Pittsburgh," www.RiverQuest.org, Press Release, pp. 1-3 (Mar. 8, 2007).

RiverQuest, "Green Boat Project," www.RiverQuest.org, Press Release.

Japan Ship Exporters' Association, "High-speed ferry Hamanasu wins The Ship of the Year 2004," SEA-Japan, No. 312, pp. 1-6, http://www.jsea.or.jp (Aug.-Sep. 2005).

Hayman, Susan "Hybrid tugboats: tomorrow's answer to air quality concerns," Port Technology International, pp. 29-30, www.portechnology.org.

Railpower Technologies, Corp. "ARB's Rail Symposium—Hybrid Locomotives: Better Economics, Better Environment," http://www.railpower.com, pp. 1-16 (Apr. 25, 2006).

MARINE LINK.COM, "Siemens Debuts ELFA Propulsion Solution," http://www.marinelink.com/Story/Siemens (Jan. 3, 2005).

* cited by examiner

HYBRID PROPULSION SYSTEMS

REFERENCE TO PRIORITY APPLICATION

This application claims priority to U.S. Patent Application No. 61/013,113 filed Dec. 12, 2007, which is incorporated herein by reference in its entirety.

FIELD OF THE INVENTION

The present invention relates to hybrid propulsion systems suitable for use in marine vessels having variable power requirements during operation, and to systems and methods for managing energy flow in hybrid propulsion systems.

BACKGROUND

Energy conservation and pollution control efforts are driving development and implementation of propulsion systems for marine vessels and for other heavy duty, variable demand applications that reduce both fuel consumption and harmful emissions. Diesel-electric propulsion has been used on submarines and surface ships for many years. In general, a diesel engine is coupled to an electric generator, which supplies power to an electric motor that is mechanically coupled to a propeller.

Various types of combined cycle propulsion systems that utilize two or more distinct power sources for propulsion, either together or separately, have also been implemented. For example, a CODOG (COmbined Diesel Or Gas) arrangement provides propulsion either by diesel engines or gas turbine engines, but not both simultaneously. In contrast, a CODAG (COmbined Diesel And Gas) arrangement would allow both types of propulsion at the same time, as well as independently. Combined cycle arrangements have been used with various combinations of diesel, diesel-electric, gas turbine and steam turbine propulsion. The Royal New Zealand Navy's multi-role vessel HMNZS Canterbury has a Combined Diesel Electric and Diesel (CODLAD) propulsion system.

U.S. Pat. No. 7,207,852 discloses a ship propulsion system in which a mechanical drive shaft extends through the hull and is driven by either a prime mover located within the ship or by an electric motor in a housing external to the ship through which the mechanical drive shaft extends. This arrangement provides the benefits of combined cycle operation without having to accommodate electric motors within limited interior space of a ship. A similar type of electric pod propulsion unit has been combined with a conventional diesel propulsion system in Ueda, N. and Numaguchi, Hajime, *The First Hybrid CRP-POD Driven Fast ROPAX Ferry in the World*, Translated from Journal of the JIME Vol. 40, No. 2, 2005.

Notwithstanding these efforts to provide combined propulsion systems for marine vessel applications, the combined systems have shown disappointing results, particularly in terms of overall fuel and performance efficiency, emissions reduction, versatility, and ability to respond quickly and efficiently to a range of propulsion demand situations.

SUMMARY

In the present hybrid propulsion system, energy for propulsion may be supplied by main engines (e.g., diesel engines or other types of prime mover engines) in a direct mechanical configuration, by motor-generators (e.g., diesel-generators in a diesel-electric configuration), by storage batteries in an all-electric configuration, or by any combination of these energy sources. Vessel hotel loads and auxiliary energy demands, such as winches and other operating equipment, may also be satisfied by the hybrid energy sources. An energy management system switches between and/or among available energy choices and alters the operation and output of the various energy sources in response to propulsive load demands, hotel loads and/or auxiliary energy demands, implementing multiple operating modes. Operation of the propulsion system across multiple operating modes allows optimization of the propulsion system's response to various conditions and enhances the fuel and performance efficiency of the overall system and of various energy sources individually, reducing emissions and satisfying a range of energy demand(s) quickly and efficiently. In some embodiments, an automated Energy Management System (EMS) implements a substantially continuously variable range of system operating modes and dynamically shifts operation of the various energy sources to satisfy propulsion and other energy demands.

The hybrid propulsion system of the present invention is described with reference to a marine vessel propulsion system and incorporates an innovative approach to marine propulsion plant configuration. The system is especially suitable for use in vessels having high propulsive load capacity requirements and variable power demands, where high power is generally demanded for intermittent time periods. The hybrid propulsion system is described with reference to main engines (e.g., diesel engines) operating in concert with motor-generator units in a dual driveline, dual propeller arrangement and was specifically designed for use with marine vessels such as tugboats. The hybrid propulsion system may, however, be employed in other marine vessels and variable power demand applications, and it may be implemented in a single engine, single drive line, and/or single propeller arrangement. Additional energy demands may be satisfied and additional energy sources may also be incorporated in systems of the present invention.

The hybrid propulsion system provides the ability to generate, store and utilize energy efficiently, and provides considerable flexibility with regard to configuration. The hybrid propulsion and energy management systems described herein minimize the unnecessary operation of multiple main drive engines, operate main drive engines only within their high efficiency ranges, and permit single or smaller engines to power numerous loads, reducing both fuel consumption and harmful emissions. The design provides for flexible configuration, typically incorporating direct-diesel, diesel-electric and all-electric propulsion, using electric energy storage and advanced power conversion techniques. The system accommodates the use of alternative energy sources when such sources are available, both onboard and from auxiliary sources, such as shore-based sources. The flexibility of the system allows it to be configured to meet a wide range of vessel duty cycles and power requirements.

The novel arrangement of propulsion power sources and control technologies may be operated by the Energy Management System (EMS), requiring little or no operator control input. According to some embodiments, the EMS is capable of configuring the power plant, comprising multiple sources of propulsive power, for high efficiency across a wide range of propulsive and other energy demands by employing "intelligent" load sharing, energy distribution and torque optimization techniques. In this way, the vessel's main propulsion engine(s) (e.g., diesel engines) and other energy sources are utilized at high efficiency across a wide range of requested shaft output speeds. In general, the main engine(s), motor-generator(s), auxiliary generator(s) and storage battery(ies)

provide power for both propulsion and auxiliary demands, such as the "hotel" load (lighting, air conditioning, domestic water pumps, etc.), auxiliary equipment requiring power, such as winches, and the like.

The main propulsion engines (e.g., diesel engines) are mechanically coupled to the drive line by means of a clutch device, for example, and are also linked to motor-generators arranged on a common driveline. Output from the main propulsion engines may drive the propulsive output shaft (e.g. propeller) or the motor-generator(s), or both, depending on the load demands and the operating mode selected or implemented. The motor-generator(s) are generally available to operate as either generators supplying energy to an electrical distribution system (e.g., bus), or as motors driving the output shaft, depending on the vessel's propulsion demand or load and the operating mode implemented.

Electrical energy distribution throughout the system is supplied to and from a common bus, generally a DC bus, and the energy flow between the DC bus and the propulsion motor-generators is preferably bi-directional. Bi-directional flow allows the motor-generators to supply excess energy to the bus when they have excess generating capacity, while also permitting the motor-generators to draw energy from the bus for operation as propulsive motors when excess energy is available. The main energy distribution bus also generally provides bi-directional energy flow to one or more energy storage systems (e.g. battery banks), permitting charging of the energy storage system when excess energy is available and drawing energy from the storage system when needed. Energy derived from other onboard or auxiliary systems, such as auxiliary generators, shore power, wind or water turbines, solar power and/or photovoltaic cells, and the like, may also be supplied to the main energy distribution bus. Auxiliary energy demands, such as hotel loads, winches and other operating equipment, and the like, may also be satisfied from the main energy distribution bus. During periods of low demand or load, the propulsion demands may be met by any combination of battery and/or auxiliary generator power and supplied via the main energy distribution DC bus and respective converter(s). When propulsion demands require less than 100% of the power generated, excess power may be used to charge the energy storage system and/or satisfy other energy demands.

The hybrid system generally comprises at least two sources providing energy for propulsion, including at least one and preferably two main propulsive engines (e.g., diesel engines), and at least one and preferably two electric motors/generators arranged in-line with the main propulsive engines. The motor/generator units are preferably linked to at least one propulsive output member, such as propeller(s) and/or Z-drive(s) by means of clutches, or functionally similar devices, allowing isolation of the main engine(s) and operation of the propulsion driveline and the propulsive output member when the main engine isn't operating. The use of clutches also allows operation of the associated electric motor/generator as a generator independent of the propulsion driveline. The main propulsive engine(s) can be used to drive motor/generator(s) provided on a common driveline with or without the Z-drive coupled.

The system's energy storage capacity may be sized and configured as necessary to provide energy for meeting the vessel's propulsion and auxiliary demands during periods of minimum demand and to assist the system in satisfying interim power requirements of short duration that exceed on-line main engine capacity. This provides system flexibility and improves responsiveness, because it allows the system to bridge the time required to bring additional generating capacity on-line when the increased power requirements span longer durations. In one embodiment, chemical storage is provided in the form of lead acid battery banks. Alternative types of batteries and energy storage devices may additionally or alternatively be incorporated in the system. When rotating reserve energy is available, the system's Energy Management System (EMS) uses the power available in the most efficient manner possible to replenish the energy storage reserves while meeting the power requirements for propulsion and any auxiliary loads.

The hybrid propulsion system often uses a dual bus electrical system with appropriate converters providing bi-directional energy flow between AC and DC buses. One or more AC buses generally provide power for the hotel loads and other relatively low impact auxiliary power demands, while the DC bus is generally the source of power distribution for all major propulsive demands, and for other high power demands such as winches and other high power equipment. The AC bus(es) may draw energy from the DC bus, and one or more auxiliary generator(s) may additionally be provided to power the AC bus directly. Excess power residing on the AC bus may be supplied to the DC bus to provide propulsive power and satisfy other system demands. The auxiliary generator(s) may thus supply energy for propulsive requirements indirectly, when excess energy is supplied from the AC to DC bus(es), and from the DC bus to the motor-generator(s) to satisfy propulsive demands. In one embodiment, Variable Frequency Drives (VFDs) are connected between the DC bus and the motor-generator(s) and are used to provide power to satisfy specified motor-generator speed and/or torque requirements.

The hybrid propulsion system produces substantial efficiencies in engine operation, fuel consumption and maintenance requirements, and reduces harmful emissions, by operating main engine(s) within high efficiency, low emission ranges and supplying propulsive energy from other sources as necessary to satisfy the propulsive demand and support engine operation at high efficiency. High load capacity engines and prime movers typically operate most efficiently within generally high output ranges, yet they're also operated within highly inefficient, low output ranges during periods of low demand operation. Specific Fuel Consumption (SFC) for diesel engines, for example, generally decreases with load. For a Caterpillar 3512 diesel engine, for example, SFC at 100% load is approximately 0.064 USgal/hp·hr while at a 25% load, SFC is 0.081 USgal/hp·hr. The SFC at lower loads, such as loads experienced during vessel standby and slow transit, is even higher, dramatically reducing operating efficiencies and increasing harmful emissions. The high SFC of high load capacity engines operating at low power levels wastes energy through the production of heat, and produces a higher level of harmful exhaust emissions due to inefficient combustion.

The hybrid propulsion system of the present invention is operated by the EMS through operator or automated system selection of various operating modes to satisfy variable propulsion and auxiliary energy demands in an efficient manner. The main engine(s) are typically operated only within operating ranges at which they exhibit high efficiency and low SFC. This reduces fuel usage primarily at the low end of the power curve, and thus produces a disproportionately large effect on overall emissions reduction. The hybrid propulsion system described herein thus reduces unneeded fuel consumption in the zone where the main propulsive engine(s) produce the most emissions per unit of energy delivered.

When the main engine(s) are operated within operating ranges at which they exhibit high efficiency and low SFC, which are typically high output operating ranges, they may satisfy the propulsive demand without requiring input from other energy sources. When the output of the main engine(s) exceeds the propulsive demand, excess energy is distributed, through the associated motor-generator, to the energy distribution system and used to satisfy auxiliary energy demands and/or stored in the system. During periods of high propulsive demand, the system load requirements may be satisfied by multiple sources, including the main engine(s), energy storage, and auxiliary generating capacity. During periods of low propulsive demand, the main engine(s) generally aren't operated and energy to satisfy propulsive demands is supplied from energy storage and/or auxiliary generating capacity. Operation of the propulsion system of the present invention in a hybrid mode may thus provide substantial efficiencies, and reduced emissions, by operating the main propulsive engines within higher efficiency, lower emission ranges regardless of the type of main propulsive engine.

The hybrid propulsion system of the present invention may additionally provide operational control features, and emissions control features (in addition to emission control equipment provided with the main engines) to ensure that the main engines are operated within desired operating parameters. Operational control may be accomplished in several different ways. In high load demand situations, for example, when the main engine(s) are running and motor/generator(s) are additionally providing positive torque to the driveline, the EMS may be configured to control, or limit, the amount of torque contributed by the main engine(s), effectively limiting engine operation at or below a specified output torque without restricting power available to the propeller. In this way, the main propulsive engine(s) may be operated at optimum efficiency throughout their power curve, minimizing the production of engine emissions.

According to one embodiment, engine operation is limited to operation within output torque ranges at or below recommended limits, with the motor-generator(s) providing power to satisfy propulsion demands in excess of those satisfied by the main engine(s) operating within the recommended torque range(s). For operation in the U.S., for example, engine operation may be controlled to remain below a local or state or federal regulatory agency recommended Not-To-Exceed (NTE) limit at all output demands, with excess power provided by other components of the hybrid propulsion system. Various NTE limits may be programmed into the system, or may be selectable by an operator depending on local regulations, operating conditions, and the like.

Inefficient fuel combustion and engine operation not only produces high levels of harmful emissions, but it also causes premature deterioration of engine components and increases maintenance frequency and cost. The hybrid system of the present invention may be operated to provide improved engine performance and durability, and to reduce maintenance costs, provide more convenient maintenance scheduling, and the like. In operational systems of the present invention, the main propulsion engine(s), and/or the propulsive motor-generator(s) may be operated by limiting or controlling various parameters in addition to torque, such as output rpm, operating time, operating temperature, and the like, to improve efficiency and performance. Overall equipment health and maintenance benefits are realized through less frequent engine overhauls, oil changes, air and oil filter replacements, and the increased ability to predict, manage and schedule maintenance events. Other components of the hybrid propulsion and energy management systems, such as auxiliary generators, energy storage systems, auxiliary energy generation systems, and the like, may also be monitored and controlled to improve overall system efficiency and durability, and to run specialized operating modes tailored to meeting specific operating conditions and component configurations.

DETAILED DESCRIPTION

Figure 1:
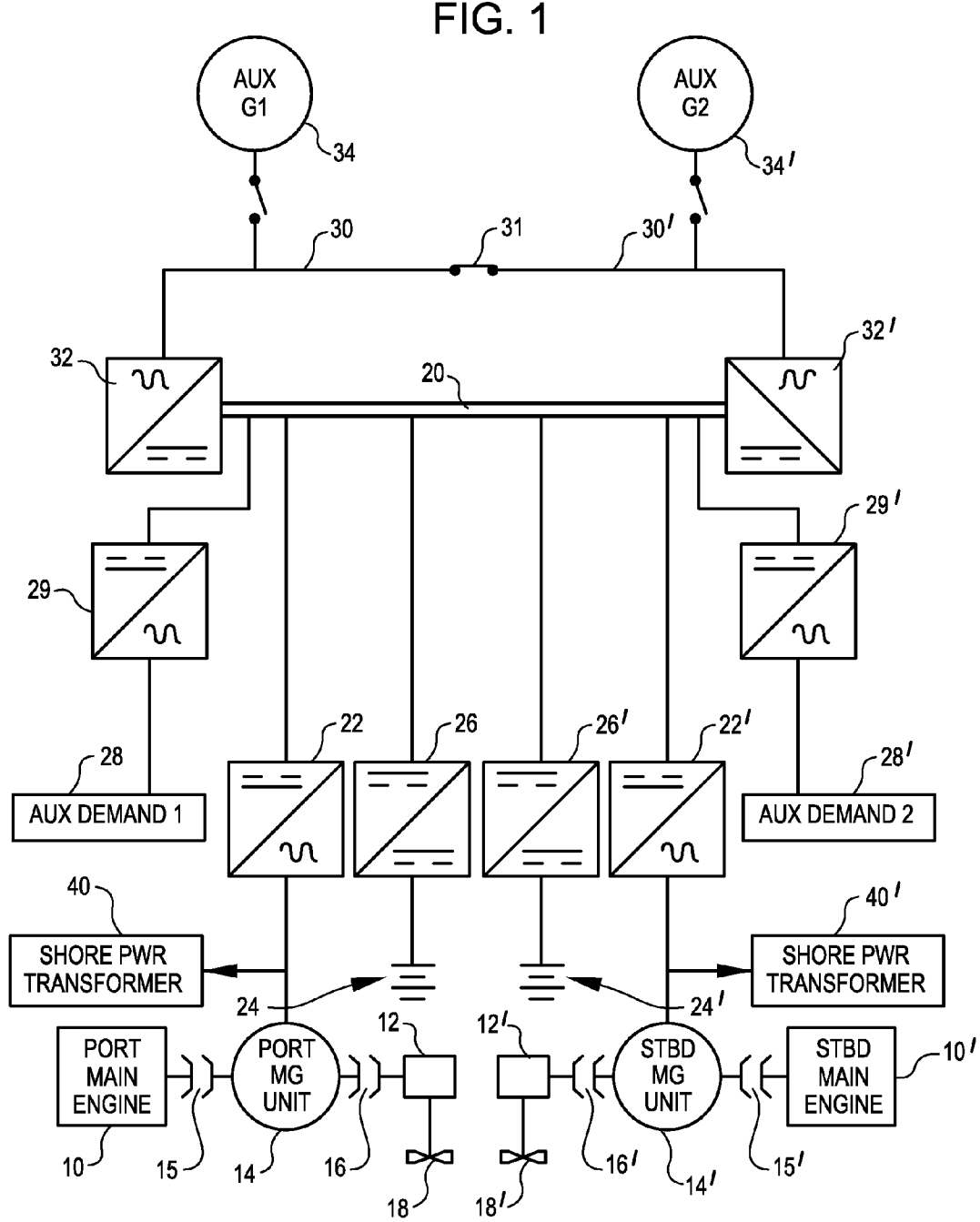
FIG. 1 illustrates a schematic diagram of an exemplary hybrid propulsion and energy distribution system of the present invention suitable for use with marine vessels having variable power demands.

An exemplary hybrid propulsion system is illustrated schematically in FIG. 1. The hybrid propulsion system of the present invention comprises at least two sources providing energy for propulsion and incorporates at least one, and preferably two, main propulsion engines, such as diesel engines 10 and 10' (e.g., port and starboard main diesel engines) and at least one, and preferably two, motor-generator units 14, 14'. In one embodiment of the hybrid system of the present invention adapted specifically for use in marine vessels such as tugboats that have highly variable operational and performance requirements, the driveline configuration of the hybrid system comprises two main propulsion engines (10, 10'), each coupled to a propulsive output member such as a propeller 18, 18' directly or through a mechanical drive system or transmission, such as azimuth thrusters 12, 12', through a propulsive driveline, each of the propulsive drivelines provided on independent and operationally parallel shafts. Although azimuth thrusters are exemplified in this description, it will be apparent that other types of gear boxes and transmission systems may be used in propulsion systems of the present invention.

The main propulsion engines 10, 10' are preferably rated to provide propulsive output substantially at or slightly above the desired maximum propulsive load potential for the system, although hybrid propulsion systems of the present invention can achieve propulsive output in excess of the rated output of the main propulsive engines for periods of limited duration using alternative sources of propulsive energy managed by the system. Different types of engines, providing different levels of propulsive output, may be used in different marine vessel applications. The use of Cummins main diesel engines having a rated output of at least about 2000 horsepower and Rolls Royce Z-drives is exemplary for use in tugboat marine vessel applications providing high propulsive load capacities.

Electric motor-generators 14, 14' (e.g., port and starboard MG units as shown in FIG. 1) are provided in the shaft lines between each main propulsive engine and its propeller 18, 18'. Each motor-generator unit is arranged "in-line" with a main propulsive engine and output shaft and is capable of providing propulsive power to the respective output shaft (and propeller) when operating in a motor mode and when a clutch mechanism 16, 16' is engaged. Each motor-generator unit is also capable of operating in a generator mode and providing electrical power to a vessel electrical power management system. The motor-generators are preferably capable of operating beyond rated output power for short durations. The motor-generator units may be provided as AC motors, such as AC squirrel cage induction motors. The use of Siemens double-shafted AC squirrel cage induction motors having a rated output of 895 Kw is exemplary for use in tugboat marine vessel applications providing high propulsive load capacities. Other types of motor-generator units are also known and may be used in systems of the present invention.

Propulsion systems of the present invention operate with each engine, motor-generator, drive shaft and propeller combination arranged "in-line," so that each of the drive shafts, and thus each of the propellers, may be directly driven solely by a main engine, or solely by a motor-generator unit, or by both sources simultaneously. Each shaft may be provided with a clutch 15, 15' that permits the main engine to turn the main shaft or to be disconnected from the drive system, thereby allowing the motor-generator(s) to act as the prime mover(s) when the main engine(s) are shut down or diverted. Each main shaft also has clutches 16, 16' permitting each motor-generator to be operated as a motor driving the output shaft when the clutches 16, 16' are engaged, or as a generator supplying energy to the energy distribution system without driving the output shaft when the clutches 16, 16' are not engaged.

The hybrid propulsion system additionally comprises an energy distribution system and generally incorporates a dual bus arrangement. A DC bus is generally provided as the power source and energy distribution system for all major loads on the vessel, including propulsion and other major loads, and preferably accommodates the vessel's energy storage capacity. In the embodiment illustrated in FIG. 1, DC bus 20 is connected to each of the motor-generator units 14, 14' through one or more drives 22, 22' providing bi-directional power flow between the DC bus 20 and motor-generator units 14, 14'. Each of the motor-generator units 14, 14' may draw energy from DC bus 20 and return energy to DC bus 20 independently of one another, and as most efficiently satisfies propulsive requirements on a real time basis. In one embodiment, drives 22, 22' comprise variable frequency drives. The use of variable frequency drives to link the motor-generators and the power distribution system allow the propulsion motor-generators to provide power to the DC bus regardless of the operation and speed of the main drive engine. Providing motor-generators on the shaft line between the main engines and the propellers, and providing variable frequency drives between the motor-generators and the DC bus, permit the motor-generators to either provide propulsive power or to act as generators and supply energy to the DC bus, depending on the system needs at any time and under different propulsive demands. Electric power for propulsion and other requirements may be generated either by auxiliary diesel generators, main diesel engines coupled to their respective motor-generators (with or without Z-Drives engaged), or by a combination of these systems.

DC bus 20 is also connected to one or more energy storage systems, such as batteries 24, 24' through appropriate converters, such as DC/DC converters 26, 26'. DC/DC converters, when used with an appropriate Energy Management System (EMS), allow the system to maintain substantially constant voltage on the DC bus and, when there is excess generating capacity, charge batteries 24, 24' with the excess energy to maintain constant voltage on the DC bus.

The DC bus may also be linked to and supply power to a hotel load distribution system, such as one or more AC buses 30, 30' connected by tiebreaker 31. In one exemplary embodiment suitable for use in tugboat marine vessel applications, each AC bus comprises a 600V, 3 phase 60 Hz bus. The AC bus(es) typically power the system's hotel load, and may supply other auxiliary, non-propulsive power needs. The hotel load distribution system, in this embodiment comprising buses 30, 30' may be linked to the main DC bus by means of DC/AC converters 32, 32'. The converters permit bi-directional flow of energy between the AC and DC buses and are sized to facilitate all anticipated loads. Auxiliary generators 34, 34' may be provided and linked to the hotel load distribution system to supply additional energy to the AC bus(es) to supplement the hotel load requirements, and/or to supplement energy to the DC bus as propulsive, hotel, efficiency and/or emissions requirements dictate. In one exemplary embodiment, the auxiliary generators comprise 250 kW Tier II ship service generators.

In some embodiments, additional power demands may also be met by the main DC bus. Using hybrid propulsion and the energy management system of the present invention, for example, high load capacity winches, such as bow and stem winches 28, 28' may additionally be powered from the DC bus, for example, through drives 29, 29', such as variable frequency drives. It will be appreciated that other equipment having high power requirements may also be powered from the DC bus, through appropriate converters or drives. In some situations, regenerative energy produced during operation of auxiliary equipment powered from the DC bus, such as winches, may also be returned to the DC bus for distribution to satisfy energy demands elsewhere in the system. Lower power requirement equipment may be powered from the DC or AC buses.

Additional power sources, such as on-board or shore-based photovoltaic power source(s), wind or tide generation power source(s), and the like, may be used to provide auxiliary energy to the hybrid system. Auxiliary energy sources may be coupled to feed the AC and/or DC bus(es). Auxiliary power systems, such as shore power, may also be used by the hybrid propulsion and energy management system of the present invention to provide energy for both propulsive and auxiliary loads. When shore power is available, the system can use it to provide power for hotel and auxiliary loads and/or to replenish stored energy supplies, which may eliminate the necessity of operating diesel engines while alongside, and reduce or eliminate reliance on on-board electrical storage capacity. The replenishment of onboard power storage from the grid is generally desirable, since it reduces engine emissions, and shore power is generally generated more efficiently, producing lower emissions, than power provided by marine vessel main engines. A shore power transformer may be provided and feed to the DC bus, for example, though an appropriate DC/DC converter.

Systems of the present invention preferably incorporate onboard renewable and rechargeable energy storage systems, such as batteries, to provide storage capacity, to support low power demands, and to provide generally short ride-through capacity between operational modes. While it is recognized that many battery choices exist, in one embodiment, lead-acid batteries employing absorbed glass mat (AGM) or gel battery technology are employed. Lead-acid battery technologies that provide a sealed, maintenance-free option capable of accepting rapid discharge/recharge rates and relatively high cycle life are preferred for many applications. The batteries are preferably fitted in vessel locations where they do not have an impact on vessel operations and are unlikely to be damaged. The batteries can be configured to maintain charge on the vessel's emergency batteries and the energy storage system is also preferably fitted with a DC/DC converter to provide energy to the main DC bus. Alternative energy storage options, such as Nickel Metal Hydride (NiMH) and Sodium Nickel Chloride (NaNiCl) batteries may also be employed for battery storage and replenishment.

It will be appreciated that this power plant overview is exemplary and that the specific layout and arrangement of components, as well as the component ratings and capacities may be varied to accommodate different propulsive and auxiliary power demands. The hybrid propulsion system illustrated in FIG. 1 is shown as a dual engine, dual generator system wherein substantially mirror image propulsion systems and drive lines are provided to drive twin propellers. It will be appreciated that single engine and multiple engine systems may be provided and operated using the hybrid propulsion and energy management systems of the present invention, to drive a single or multiple propellers. It will also be appreciated that the hybrid propulsion system may be provided as a stand-alone, newly installed system, or that various components may be retrofitted and reconfigured to convert existing propulsion systems to the hybrid propulsion and energy management system of the present invention.

When the hybrid system is retrofitted to existing systems, an existing AC switchboard may be maintained and may be integrated into an additional AC switchboard if additional AC power is needed. The pre-existing AC switchboard may be configured, for example, to essentially supply hotel load only, while existing connections for auxiliary generator incomers, deck winches and other high power requirement components may be re-routed to a main energy management DC bus. Deck winches and other significant loads are preferably run by frequency drives off the DC bus. This increases the stability of the AC bus and reduces the impact of voltage fluctuations on the connected hotel loads.

Converters connected between the DC and AC buses permit energy to flow from the main DC bus to the AC bus(es) as required to satisfy the vessel's hotel load and other AC loads. Power is also be provided from the main DC bus to propulsion motor-generator unit(s) through converter(s) or variable frequency drive(s) to power the shaft during modes of operation in which the motor is operated to drive the output shaft. In modes of operation in which the motor-generator is operated in a generator mode, energy is supplied from the motor to the main DC bus to provide energy for auxiliary requirements and to recharge the energy storage reserves, as required. When one or both of the auxiliary generators are running and powering the AC bus, excess energy may be supplied from the AC to the the DC bus, through converters, to provide power for propulsion and other requirements provided from the main DC bus.

As system power and propulsive demands vary, operation of the hybrid propulsion and energy management system is adjusted and varied to provide efficient operation across a wide range of demands from multiple sources. In some control and implementation schemes, an operator may select desired operating parameters from among a pre-defined set of input choices governing operation of the system. In some embodiments, an operator may select a desired output, or combination of outputs, allowing the propulsion and energy management systems to satisfy the output demand in the most fuel efficient manner, in the lowest emission manner, in the most overall energy-balanced manner, or the like. Operation of the hybrid propulsion and energy management system may be monitored and controlled automatically by the EMS according to predetermined operating protocols. In embodiments where predetermined modes of operation are provided and are selectable by an operator, or are selected by the system depending upon desired output requirements specified by an operator, a few or many different modes of operation may be provided. In alternative embodiments, the system may operate in a substantially continuously variable mode, as the EMS monitors component and overall system performance and energy and power demands, and identifies preferred operating parameters on a substantially real-time basis, operating the hybrid propulsion and energy management system in the most efficient manner, depending on the system configuration, available energy sources, and the like.

Exemplary operating modes may be considered as components of a conceptual model designed to help operators understand what operating parameters the system is likely to select, and what level of system performance, fuel economy and emissions reductions may be expected using various system and operating mode configurations. When the load demanded exceeds the capacity of the system in an operating mode for longer than a pre-determined time period, the control system may automatically escalate the system mode to achieve the required power generation. While multiple distinct modes of operation are described below with reference to FIGS. 2A-5C, it will be appreciated these operational modes are exemplary and that additional and/or different modes of operation are possible and would be desirable in certain circumstances. It will also be appreciated that the specific component configurations shown in each of FIGS. 2A-5C are exemplary for each particular mode of operation and that other configurations are possible within each mode.

Figure 2A:
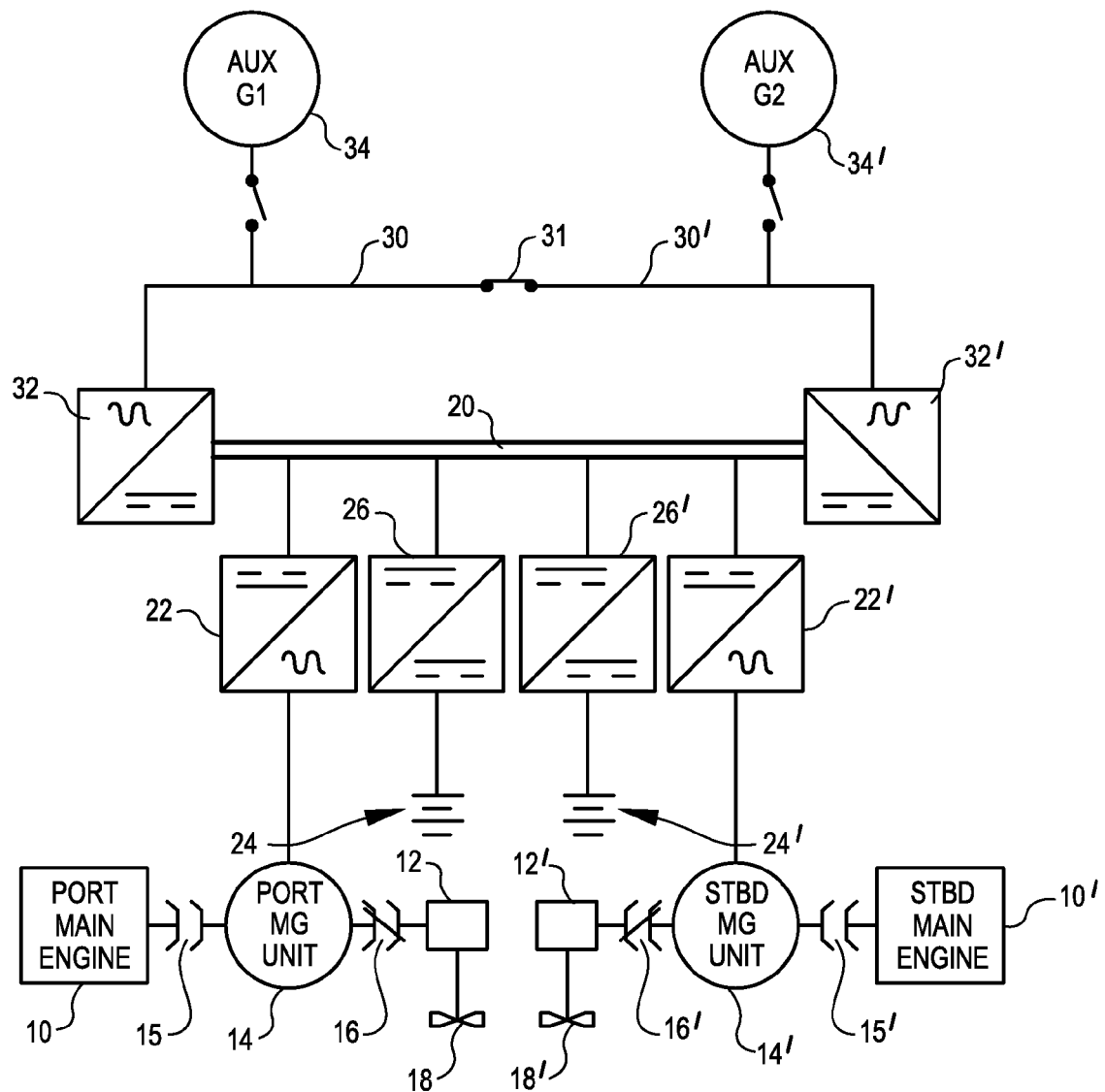
FIG. 2A shows a schematic diagram illustrating an exemplary minimal emissions mode of system operation suitable for operating marine vessels having high capacity propulsion systems during periods of vessel inactivity, as well as slow and/or no-load transiting, where the maximum continuous propulsion load doesn't exceed from about 5% to 10% of maximum propulsion load potential for an extended period.

An exemplary minimal emissions mode operating scheme suitable for vessel operation during periods of inactivity and slow and/or no-load transiting, where the maximum continuous load doesn't exceed from about 5% to 10% of the maximum propulsive load potential for an extended period is shown in FIG. 2A. This mode is generally used during periods of vessel inactivity while the vessel is secured and not drawing shore power, when the vessel is moving at very slow speed and not pulling a load, and when a continuous load doesn't exceed about 10% of the maximum capacity for an extended period. Operation in a minimal emissions mode typically utilizes battery storage capacity alone to supply the main DC bus and propulsive requirements, with utilization of a motor-generator for additional energy capacity and storage. In the exemplary minimal emissions mode scheme illustrated in FIG. 2A, energy stored in onboard batteries 24, 24' is fed to DC bus 20 through appropriate converters 26, 26'. The main DC bus 20 provides power to the AC buses 30, 30' through appropriate converters 32, 32' to satisfy hotel load demands. Appropriate feeder/breaker(s) and interlock mechanism(s) may be provided on the AC and DC buses, as is known in the art. The hotel load may generally be satisfied from battery sources alone for extended periods, if necessary or desired.

In this type of minimal emissions mode of operation, the main DC bus 20 may also provide energy, as needed, to motor-generator units 14, 14' to satisfy relatively low propulsive demands. In this configuration, motor-generator clutches 16, 16' are engaged to drive propellers 18, 18'. Neither of the main engines 10, 10' is operating, and neither of the main engine clutches 15, 15' is engaged to contribute propulsive output to the drive shaft. Main engines 10, 10' are, however, maintained in a ready-to-start condition pending increased propulsive demands or switching to a different, higher propulsive demand mode of operation. In general, neither of the auxiliary generators 34, 34' available to provide energy to the AC buses 30, 30' is operated in a minimal emissions mode. One or both of the auxiliary generators 34, 34' may, however, be in a stand-by mode, and may be available to provide power to one or both of the AC buses 30, 30' by closing switches 35, 35'. In this operating mode, AC buses 30, 30' may also supply energy to DC bus 20, through converters 32, 32', to provide propulsive power, as needed, to motor-generator units 14, 14'.

For low energy and low propulsive power demands, as generally experienced in a minimal emissions mode, stored energy may be sufficient to satisfy the energy and propulsive power demands. Typically, a pre-determined minimum battery charge level is identified and incorporated into the control logic of the energy management system. When a minimum battery charge threshold is reached, one or both of the auxiliary generators is started to provide energy to the AC bus. To the extent that excess energy is available on the AC bus, excess energy is fed from the AC bus(es) to the DC bus to satisfy propulsive or other vessel demands, such as winch power demands, and the like. To the extent that excess energy is available on the DC bus, excess energy is supplied from the DC bus to the energy storage system (batteries) to restore battery power. One or both of the auxiliary generators may be inactivated when the battery power is restored to a desired or predetermined level, or the hotel demands have diminished, or propulsive demands have diminished, or some combination of these circumstances. The in-line arrangement of the main engines, motor-generator units and clutches allows for operation of the drive train in low propulsive demand situations without operating a main engine, and also allows for operation of the motor-generator units as generators providing energy for distribution and use elsewhere in the system independent of the propulsion driveline.

Figure 2B:
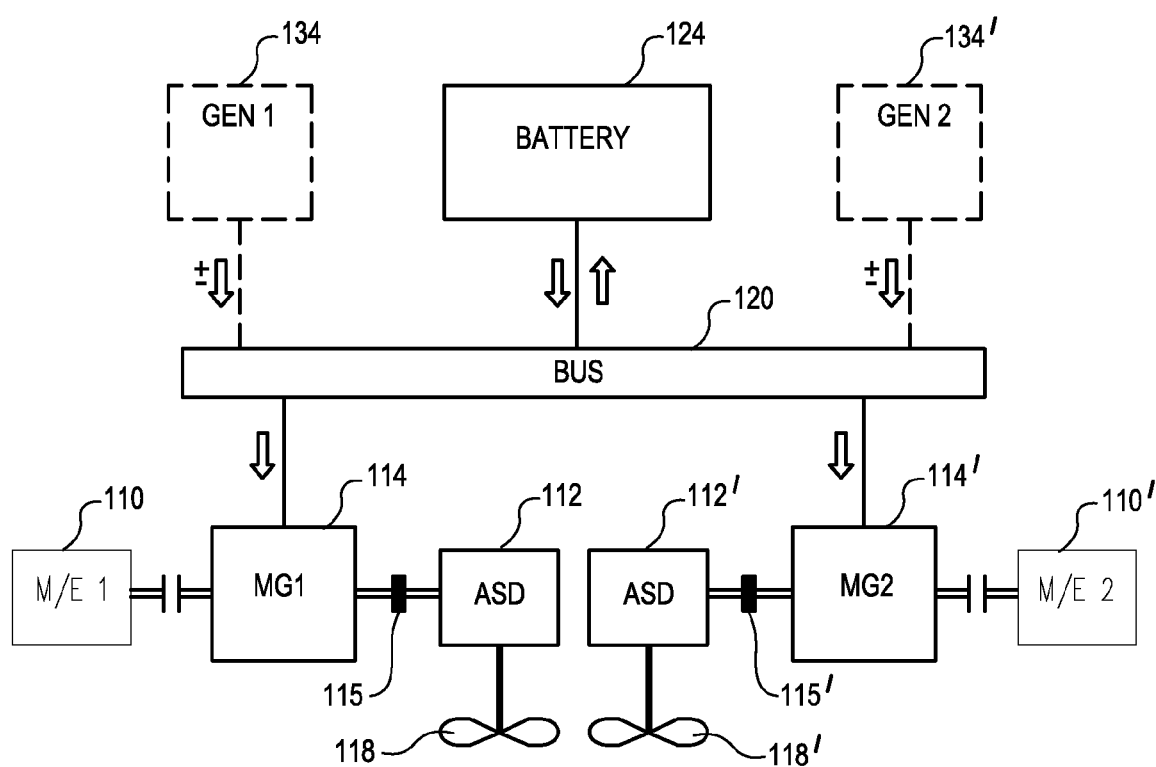
FIG. 2B shows a schematic diagram illustrating exemplary operation of a propulsion and energy management system in a low power demand, minimum emissions mode, slow transit state.

FIG. 2B illustrates a similar minimal emissions, low propulsive power mode of operation in a system illustrated schematically as having a single electrical distribution bus 120. The solid arrows indicate the direction of energy flow during this operating mode. In this minimal emissions, low propulsive power operating mode, energy is shuttled from battery bank 124 to bus 120 when energy is required to maintain a desired bus capacity, and energy is supplied from bus 120 to battery bank 124 when energy in excess of that required to maintain a desired bus capacity is available, as indicated by the solid arrows. Propellers 118 and 118' are driven exclusively by motor-generators 114, 114' operating in a drive motor mode and coupled to the drive shaft by engaged generator clutches 116, 116' respectively. Electrical energy for driving motor-generators 114, 114' in a drive motor mode is supplied by bus 120, as indicated by the solid arrows. Main propulsive engines 110 and 110' are not activated in this operating mode and are thus shown in a light typeface, with main engine clutches 115, 115' disengaged. Auxiliary generators 34, 34' are optionally activated, and may be operated intermittently, as indicated by the dashed lines, to supply energy (indicated by the black arrows) to bus 120 for hotel and/or propulsive requirements, as necessary.

Figure 3A:
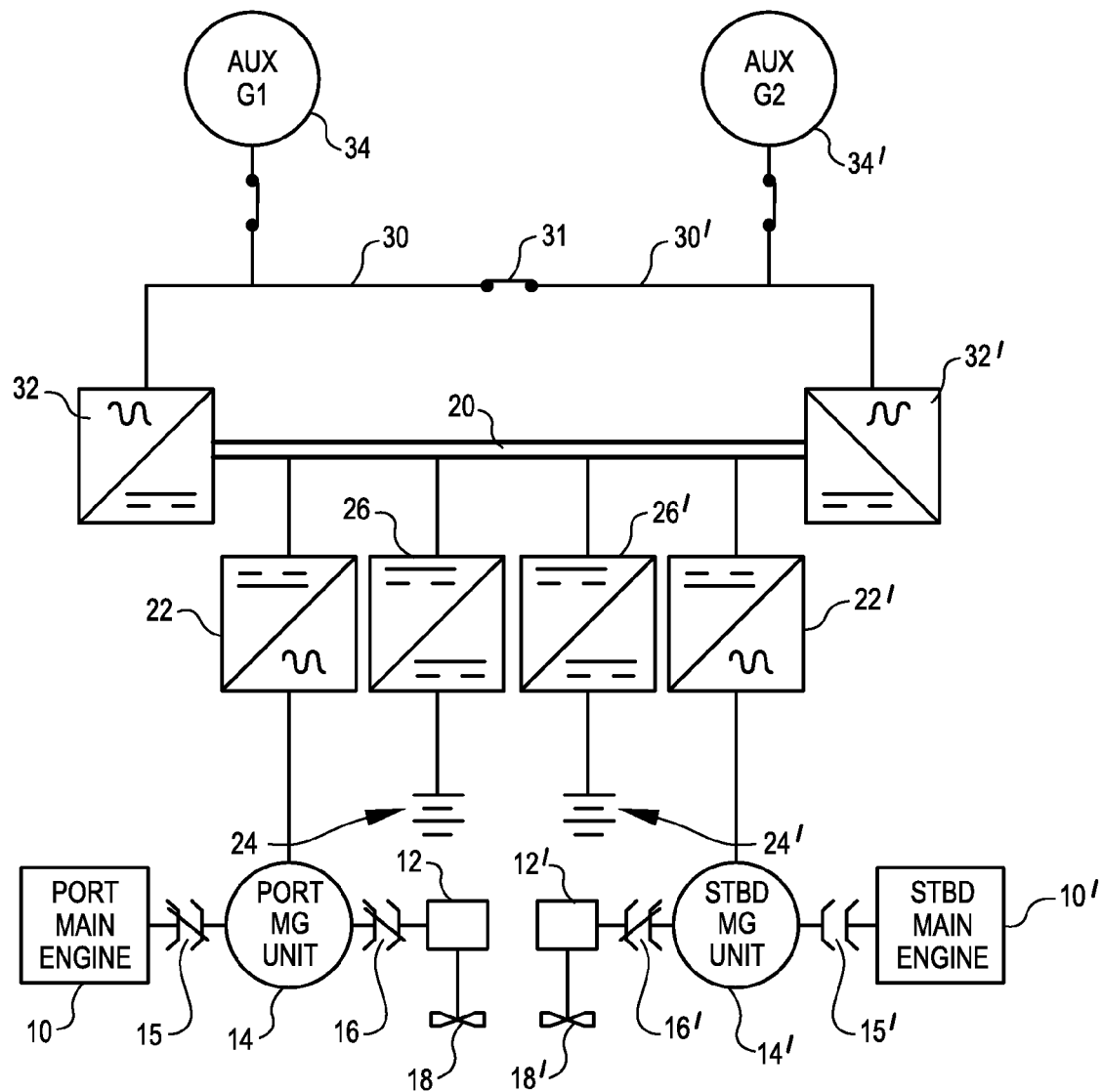
FIG. 3A shows a schematic diagram illustrating an exemplary eco-cruise mode of system operation providing the capacity for continuous slow or medium transit and low power assist work where the maximum continuous load doesn't exceed from about 15% to 35% of the maximum propulsion load potential for an extended period.

FIG. 3A illustrates the propulsion system of the present invention as it would operate in an exemplary generally relatively low propulsive power demand cruising mode in which the propulsion and energy management system provides propulsive capacity for continuous slow transit and low power assist work. In general, this operating mode is appropriate when the maximum continuous propulsive load is at least about 5% but does not exceed about 35% of the maximum load capacity of the propulsion system. In this mode of operation, energy from battery storage systems 24, 24' is generally available to provide power to DC bus 20, and at least one, and preferably two, auxiliary generators 34, 34' are activated and operated to provide power to AC buses 30, 30' and, through appropriate converters 32, 32', to DC bus 20. DC bus 20 distributes energy to the motor-generator units 14, 14', which drive the output shaft and propellers 18, 18' through engaged clutches 16, 16'. The operation of auxiliary generators 34, 34' in a low propulsive demand cruising mode is generally determined by the demands of the propulsion system and the hotel and other load demands, and by the component efficiency curves, component capacities, and the configuration of the overall system. Energy is generally drawn from battery storage and auxiliary generators first and, if additional propulsive power is required, or if additional energy is required to satisfy hotel or auxiliary demands, one of the main engines is brought online.

In general, if the electrical and/or propulsive load demands exceed the capacity of the auxiliary generator(s) for longer than a pre-determined period, the EMS automatically starts at least one of the main engine(s) 10, 10' to satisfy the energy requirements and achieve the necessary power generation. The operating configuration illustrated in FIG. 3A includes operation of auxiliary generators 34 and 34' as well as main engine 10, which provides propulsive power to the driveline and propeller 18 by means of the engaged clutch 15. Low propulsive demand cruising modes generally require activation of a single main engine. And, engine operation at generally high efficiency, high output conditions provides both propulsive power and provides excess energy generation that is returned to the main energy distribution bus 20, through motor generator 14. Excess energy provided to bus 20 may be used for auxiliary power demands, to replenish the energy storage system and, as described below, to provide propulsive power to the opposite output shaft.

The hybrid propulsion and energy management system configuration of the present invention preferably allows a single main engine to effectively drive two propulsion output shafts. In the exemplary embodiment illustrated in FIG. 3B, main engine 110 operates in a generally high efficiency, high output mode to directly drive the azimuth drive 112 and propeller 118 on its output shaft. In this embodiment, main engine 110 also drives motor-generator 114 in a generator mode to supply energy to the DC bus 120 (indicated by the arrow) which, in turn, supplies energy (indicated by the arrow) to motor/generator 114', which operates in a drive mode to drive the azimuth drive 112' and propeller 118' on the other drive shaft. In this configuration, auxiliary generators 134, 134' are also operated to provide energy (indicated by the arrows) to bus 120.

Figure 3B:
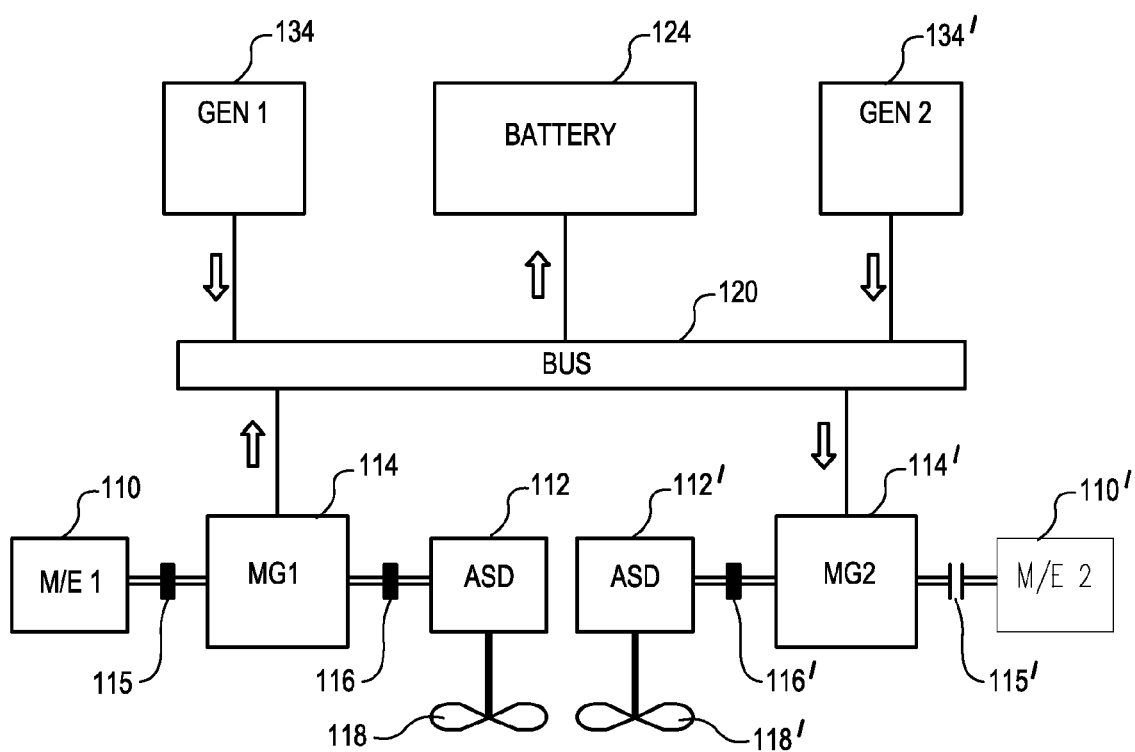
FIG. 3B shows a schematic diagram illustrating exemplary operation of a propulsion and energy management system in a generally low to medium power demand mode.

Thus, in the relatively low propulsive power demand configuration shown in FIG. 3B, one main engine and two auxiliary generators are available to supply both propulsive and hotel and auxiliary power demands. This configuration reduces the amount of time that both main engines are required for propulsion and enables the main engine(s), which operate more efficiently at high load ranges, to run at higher efficiency than it/they otherwise would. Excess energy on bus 120 is supplied to the battery storage system 124, which is generally in a charging state. The controller may be programmed to alternate the main engine designated as the primary responder in this mode throughout the life cycle of the engine and the vessel. As with other operating modes, temporary ride-through of transient demands may be provided by the battery storage system.

Figure 4A:
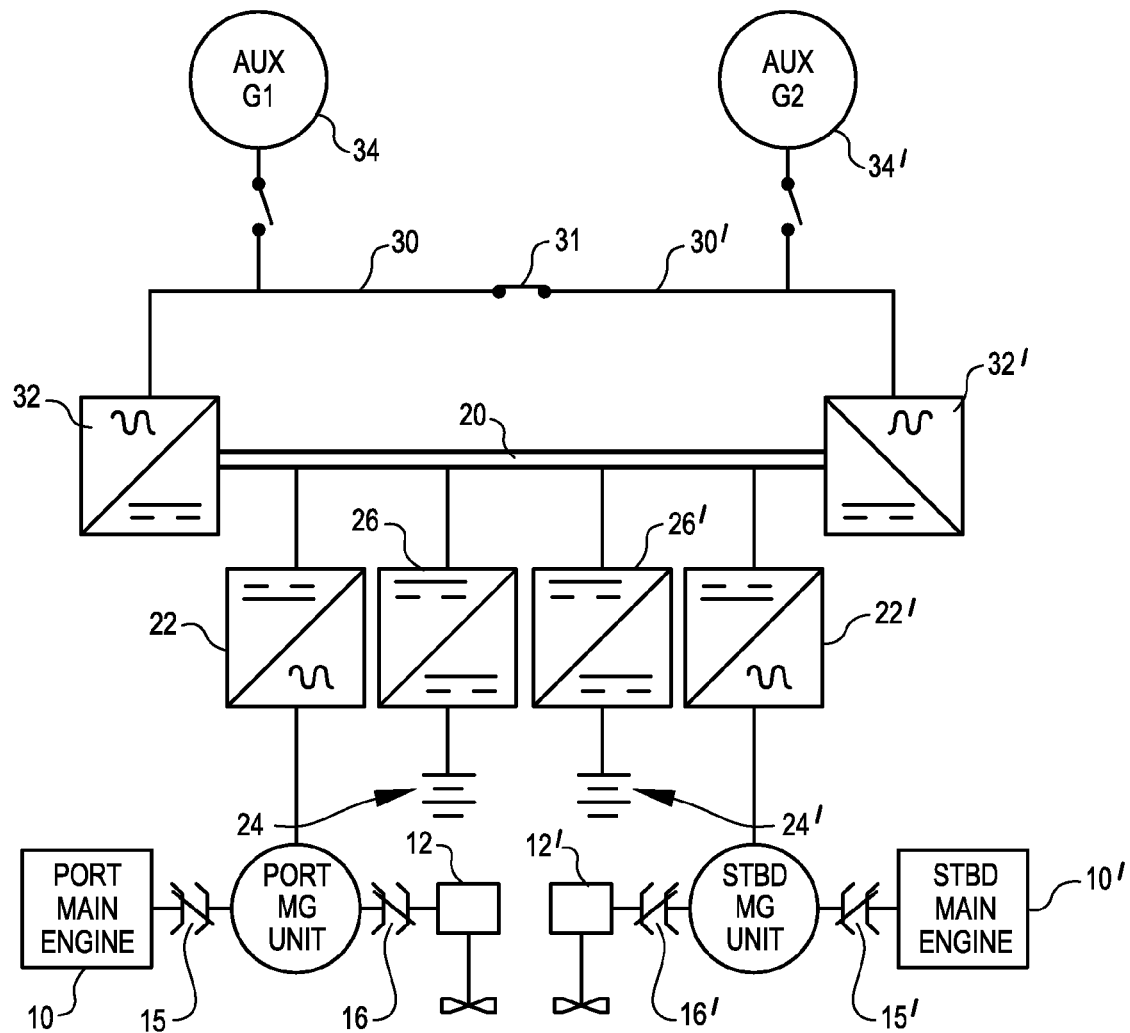
FIG. 4A shows a schematic diagram illustrating a mid-range mode of system operation having a wider and higher range propulsion load capacity of from about 30% to 70% maximum propulsion load potential.

A mid-range propulsion demand operating mode is shown schematically in FIG. 4A. This operating mode generally provides sufficient propulsive load capacity for continuous transit and a high percentage of vessel assist scenarios where the maximum propulsive load demand doesn't exceed about 30% to 70% of the total load capacity for extended periods. In this operating mode, at least one, and generally two main engines are operated, continuously or intermittently at generally high efficiency and high output, to satisfy the propulsive, hotel and auxiliary load requirements. Excess energy is supplied to the main electrical distribution bus to satisfy hotel and auxiliary load demands, and to provide battery charging as appropriate. One or both of the auxiliary generators, and battery storage, are available for auxiliary power generation in this mode.

As shown in FIG. 4A, propulsion is generally provided by main engines 10, 10' operating at generally high output, consistent with high efficiency operation. Both main engines 10, 10' are used to power azimuth drives 12, 12' and propellers 18, 18', through engaged clutches 15, 15', 16 and 16'. Main engines 10, 10', when operated at high output in this mode, generally produce output in excess of that required for propulsive demands and also provide energy to drive motor/generators 14, 14' in a generator mode in which energy is provided to bus 20 for distribution and use in satisfying hotel load demands, auxiliary load demands such as winch demands, and to charge the batteries. Auxiliary generators 34, 34' are generally not activated in this mode because the main engines provide output satisfying all of the propulsive and auxiliary needs.

If the propulsive power and energy provided by operation of both main engines simultaneously in a mid-range propulsion mode is in excess of that required by propulsive, hotel, auxiliary and energy storage demands, one of the main engines may be inactivated and the system may be operated substantially as shown in FIG. 3B for intermittent periods. Energy may be supplied from battery storage to the main bus and distributed as required during periods of reduced main engine operation. As described previously, the flexibility of the system permits a single main engine to be used to drive both propulsion drive lines, and battery storage can provide temporary ride-through of transient demands. This configuration increases the efficiency of the system while two main engines are running and generally reduces the amount of time in which two main engines are running, improving the efficiency of the engine that is operating by increasing its load to the optimal range. When battery reserves are low and propulsive, hotel or auxiliary demands increase, both engines may again be operated to provide satisfy ongoing demand and to replenish battery storage. The controller may be programmed to alternate the main engine designated as the primary responder in this mode throughout the life cycle of the engine and the vessel, although manual control may also be provided to allow the operator to manage engine usage to optimize the vessel's performance and maintenance schedule.

Figure 4B:
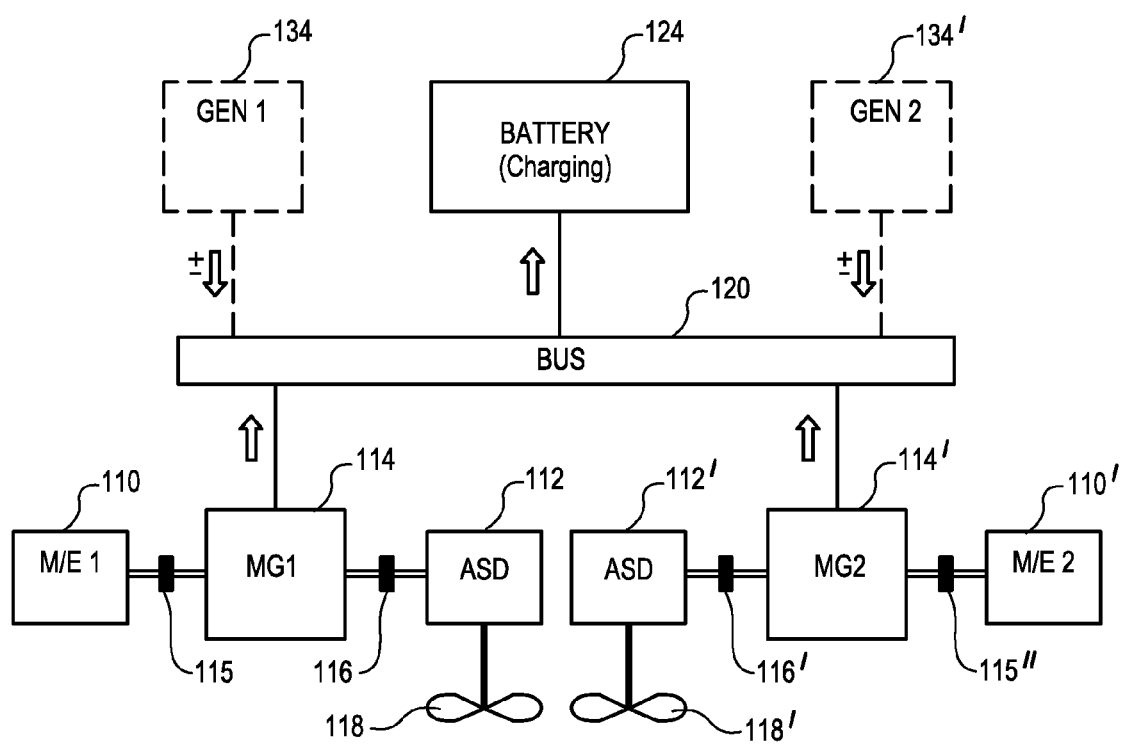
FIG. 4B shows a schematic diagram illustrating exemplary operation of a propulsion and energy management system in a generally mid-level power range demand mode

A similar mid-range propulsion demand operating mode is illustrated schematically in FIG. 4B in a system illustrated schematically as having a single electrical distribution bus 120. The solid arrows indicate the direction of energy flow during this operating mode. Main engines 110, 110' provide propulsive power to the drive shaft, azimuth drives 112, 112' and propellers 118, 118' through suitable clutch devices. Main engines 110, 110' also provide energy to operate motor-generators 114, 114' in a generator mode, whereby they supply energy to bus 120 for satisfying hotel and auxiliary loads, and for charging battery bank 124, as appropriate. One or both of the auxiliary generators 134, 134' may be operated transiently in this mode, as indicated by the dashed lines, to provide additional energy to bus 120 to satisfy higher demand transient hotel or auxiliary loads, or to charge the energy storage system(s) more quickly or more completely.

Figure 5A:
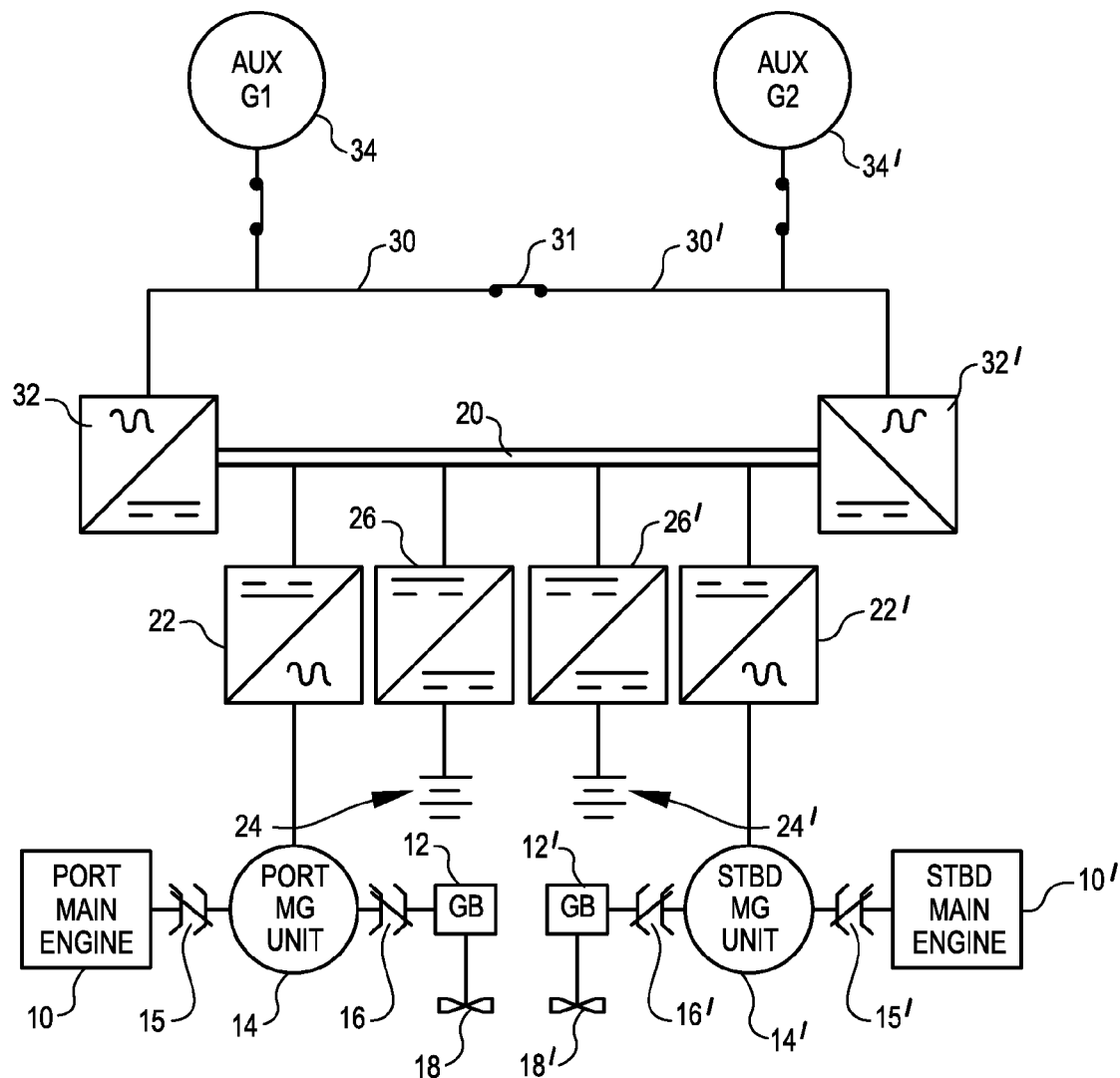
FIG. 5A shows a schematic diagram illustrating a full power mode of operation providing high capacity propulsion operation for continuous fast transit and full power assist requirements having a load capacity of from about 60% to about 100% or more of the maximum propulsion load potential.

FIG. 5A schematically illustrates a full power operating mode of the propulsion and energy management system of the present invention in which the propulsion system operates at substantially 90% or more of the rated propulsive load capacity of the main engines. This operating mode is used, for example, when it is anticipated that large, long duration loads will be encountered, for continuous fast transit, and/or for full power ship assist demands. It allows the system to meet or exceed the performance capacity of non-hybrid propulsion systems incorporating higher capacity main engines by providing auxiliary power sources and efficiently managing the available power. Even in this mode, power can be generated by the motor-generators in the shaft line when the propulsion demand is not 100% of the main engine load capacity. This excess power can be supplied to the DC bus and used for hotel and auxiliary power demands, and to charge the energy storage system. In the full operation mode, with all equipment operational, the system may have the ability to apply more power to the drives than is available in a non-hybrid system incorporating main engines having the same output capacity. This may be utilized as a means to provide faster system response, or if the driveline is capable of handling the additional torque, it may be possible to increase the vessel's rated horsepower. Increased output for short periods may be provided.

Propulsion in a full power operating mode, as illustrated in FIG. 5A, is generally provided by main engines 10, 10' operating at generally high efficiency, high output, providing propulsive power to propellers 18, 18' through the respective engaged clutches. When the propulsion and energy management system is operating in this full power mode, the motor-generator units 14, 14', provided on the output shaft drive line, are available to operate as either generators, supplying excess energy produced by the main engines to the main energy distribution bus 20, or as motors, drawing energy from the main energy distribution bus 20 to supply additional propulsive drive to the output shaft(s). When operated in a propulsive motor mode, the motor-generators are operated via the DC bus, through respective converters, with energy to the bus supplied by any combination of battery and/or auxiliary generator power. Auxiliary generators 34, 34' are generally both operated in this mode, providing energy to the main distribution DC bus 20 through AC bus 30, 30' and the respective converters 32, 32'.

In some full power operating modes, propulsive power is provided by both the main engines and the motor-generator units operating as motors, with both propulsive power sources providing output to a common shaft. Any energy supplied to the energy distribution bus 20 in excess of that required to satisfy the hotel load, the motor/generator demands and any auxiliary demands, is returned to the energy storage system (batteries 24, 24'). The main engines, motor generator units and auxiliary generators generally have sufficient rated power to supply all anticipated propulsive power requirements, hotel loads, and auxiliary energy requirements during the full power operating mode.

Figure 5B:
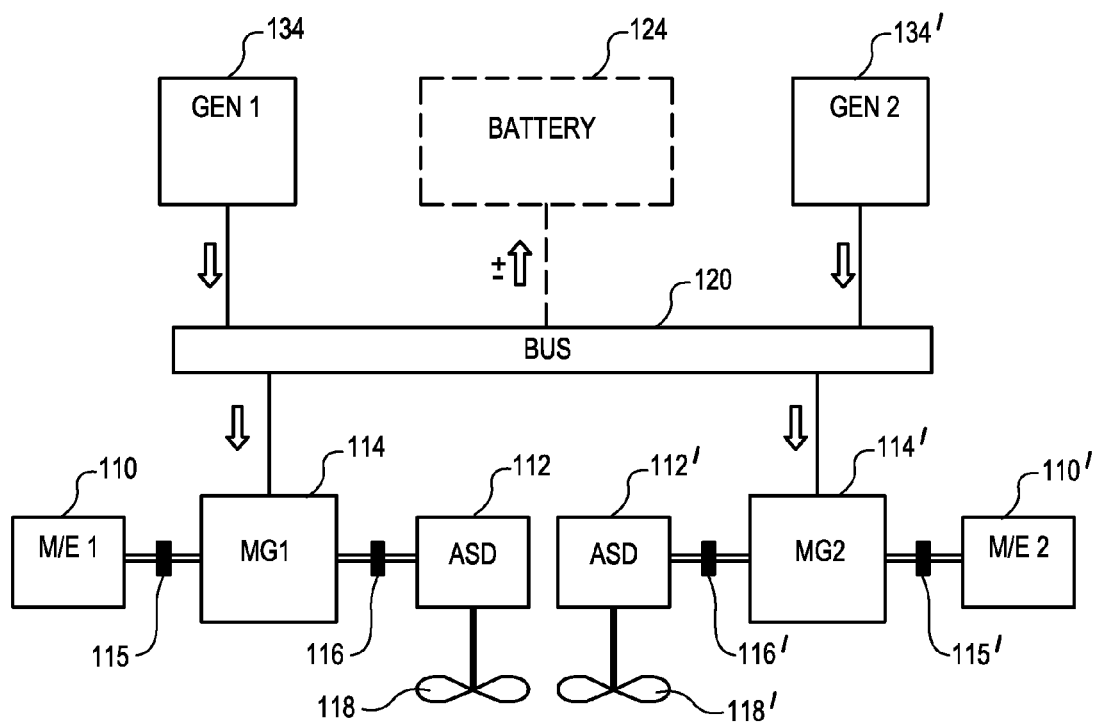
FIG. 5B shows a schematic diagram illustrating exemplary operation of a propulsion and energy management system in a generally high load demand mode of operation providing high load capacity propulsion.
Figure 5C:
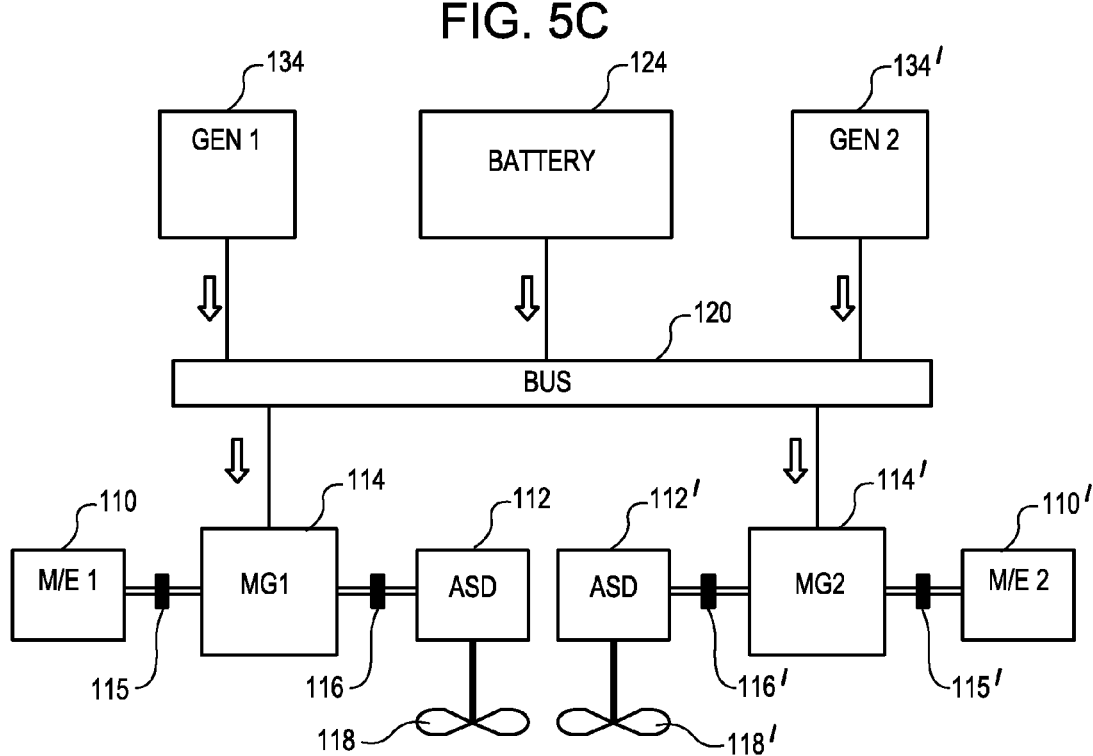
FIG. 5C shows a schematic diagram illustrating exemplary operation of a propulsion and energy management system in a generally transient, high load demand mode of operation satisfying propulsive load demand in excess of the rated system power.

Two different full power operating modes are illustrated schematically in FIGS. 5B and 5C in systems having a single electrical distribution bus 120, and in which the solid arrows indicate the direction of energy flow during operation. In the full power operating mode illustrated in FIG. 5B, both main engines 110, 110' provide full power output, through appropriate clutch mechanisms, to azimuth drives 112, 112' and propellers 118, 118'. Both auxiliary generators 134, 134' are operated to provide energy to main energy distribution bus 120. Both motor-generator units 114, 114' are operated in a motor drive mode inline with the main engines and draw energy from bus 120 to contribute propulsive power to the respective output shafts. This configuration may be used when the propulsive demand is lower than the total load capacity of the main engines and motor-generators, and generally returns excess energy available on the main bus 120 to the energy storage system (e.g., battery bank 124), which operates in a charging mode.

FIG. 5C illustrates another full power operating mode that may be used, generally transiently, when the propulsive demand is higher than the total load capacity of the main engines and the motor-generators. In this embodiment, both main engines 110, 110 'provide full power output, through appropriate clutch mechanisms, to azimuth drives 112, 112' and propellers 118, 118'. Both auxiliary generators 134, 134' are operated to provide energy to main energy distribution bus 120. Both motor-generator units 114, 114' are operated in a motor drive mode inline with the main engines and draw energy from bus 120 to contribute propulsive power to the respective output shafts. Battery energy is additionally provided to the bus 120 to provide propulsive power in excess of the rated power for propulsion for transient periods, or to satisfy auxiliary or hotel loads. This mode of operation may only be sustained until the battery bank is drawn down or exhausted. In general, this over capacity operating mode is used only intermittently, or to satisfy transient high power requirements.

The Energy Management System (EMS), as described above, controls many aspects of operation of the propulsion system, the energy distribution system, and the energy storage system, to operate the various propulsion sources, and distribute energy throughout the system in an efficient manner while satisfying variable energy requirements from multiple sources. The EMS may include multiple functions, or be part of a larger operational system including, in general, an operator interface, which may allow the operator to select from among a plurality of predetermined operating modes, sensors providing input to the EMS relating to various component outputs, capacities, current operating parameters and conditions, energy levels, etc., generator and system protection systems, system maintenance utilities, system alarm and notification utilities, and the like. The EMS typically responds to load demands throughout the hybrid propulsion system by operating and changing operation states and outputs of the main engine(s), motor-generator unit(s), the driveline and other clutches, auxiliary generator(s), battery storage system(s), as described previously. In some embodiments, the operational system may allow the operator to select certain operating parameters, such as driveline rpm and/or torque, transit speed and/or duration, load requirements and/or duration, or the like, which are used by the overall control system to formulate and implement appropriate operating modes.

An operator interface with the propulsion and EMS system(s) may comprise an electronic monitor allowing the operator to view, and monitor, operation and control of the propulsion and energy management system. Operating modes may be operator chosen or automatically implemented. Multiple distinct operating modes may be provided, and programmed. Operator control devices, such as electronic accelerator pedals, joysticks and levers, may be provided for operator input and coupled to the propulsion and energy management systems. An operator may have an option to control propulsion via an input device such as an electronic lever or joystick, or an operator may have an option to control propulsion energy management via an interface providing multiple preselected inputs or allowing the operator to specify desired inputs. A simple operating platform for non-technical personnel with system operating parameters and alarms or warnings displayed on a monitor or a touch screen may be provided, for example. The system may also provide the interface for more detailed maintenance and information access/management and may combine all machinery monitoring into a single platform. A display, optionally incorporating a touch screen, various command components and discrete controls, may be integrated into a single component, such as a main wheelhouse console.

The number of engines and generators in operation at any given time is determined by the demands of the propulsion system and auxiliary loads, such as hotel and auxiliary equipment requirements. If these loads exceed the capacity of the engine(s) and/or generator(s) operating in any specified operating mode for longer than a predetermined period, the Energy Management System automatically escalates the system operating mode and activates appropriate additional engine(s), motor-generator(s), auxiliary generator(s), or the like, to provide the necessary power generation. Control of the system may be provided either manually or in a partially or fully automated fashion, through the EMS. The EMS monitors the output, operating status and energy levels available from various energy sources within the system, determines the system's propulsion and auxiliary power needs, and controls operation of the engines, auxiliary generators, motor-generator units, and more generally may control energy flow throughout the system to satisfy the load and power requirements. Temporary ride-through of transient demands may be provided by the energy storage system.

In some automated control systems of the present invention, the system operating mode may be selected and adjusted, on a real time and substantially continuous basis, to the various system demands, and is controlled and limited by the EMS. While several operational modes are described in detail above, it will be recognized that additional operational modes may be provided. In practice, operation of the vessel and the EMS may be automated and operated according to predetermined operating modes as dictated by the power requirements and available power resources, or various predetermined operating modes may be selectable by an operator to meet the vessel's current or anticipated operational requirements. Discrete controls may be provided in a separate panel to allow an operator to select pre-programmed operational modes, as described above. In one embodiment, an operator may select the most practical mode for the vessel's current or anticipated operational requirements. Throttle advance beyond the available sustained power in the selected mode may initiate an automated advance to the next operational level or mode, or may actuate a signal or alarm that requires a positive response. In another embodiment, if the vessel operates for more than a predetermined time period in a mode that provides more power than the necessary load or output, the EMS may provide an indication or signal to the operator, indicating that operation in a more efficient mode is available. In general, although automated mode selection may be provided under some circumstances or may be a default operation, the operator has the ability to override the mode selection.

In addition to the ability to operate the hybrid propulsion system in the power modes described above, in some embodiments, the ability of the EMS to select certain power modes may be limited by the operator's or the system's selection of one of multiple states of readiness. The readiness state may be selected by the operator or automatically applied by the EMS to govern how battery power is allocated during operation. The provision of "transit," "assist" and "battery recovery" power modes is exemplary. The transit and assist modes may be selectable by an operator through selectable control features. The battery recovery state is a limitation on full power that may be imposed automatically or may be selectable under conditions when the battery power available has gone below a predetermined minimum or when the batteries are discharged or overheated. In this way, the hybrid system is able (for example) to prevent the shutting down of main engines during ship-assist operations, or the over-stressing of depleted storage batteries by excessive power use.

In general, sufficient reserve capacity is preferably maintained and available to provide immediate electric propulsion power to approximately 70% of full load for short bursts. This reduces delays between operating modes while additional generating capacity comes on line. A sustained advance beyond a predetermined power level, such as 65% power, may be programmed to automatically start one or both of the main engine(s). In this case, a minor delay may be experienced. In situations where such delays are not acceptable, full mode operation may be selected in advance.

One or more selectable, programmable or programmed emission control features may also be provided. The U.S. Environmental Protection Agency provides torque and shaft speed parameters defining a "not to exceed" (NTE) operating limit, for example, for marine diesel engines. The hybrid propulsion system of the present invention may provide operational emission control features, in addition to emission control equipment provided with the main engines, to ensure that the main engines are always operated within EPA requirements or alternative operating limits. Operational emission control may ensure, for example, that when one or both main propulsion motor-generators share the propulsion load with one or both main engines, the torque developed by the main engine(s), at any given speed, is below the EPA NTE limit.

Operational emission control features may be implemented through the variable frequency drives. In one embodiment, the variable frequency drives used to control the AC main propulsion motors are operated in one of two basic open-loop control schemes: frequency or torque control. An open-loop frequency control scheme, for example, is used under electric-only propulsion. In this scheme, the control system determines the frequency (and, in a linear relationship, the voltage) to apply to the motor to achieve a set point shaft speed. The motor develops the torque required to turn the shaft at the given set point speed, and the current drawn varies accordingly. An open-loop torque control scheme is used during combined diesel and electrical propulsion. Under this scheme, the control system regulates both the motor speed and torque by manipulating the electromagnetic state of the motor, controlling torque-producing and field-producing currents separately. The motor provides only the portion of the required propeller torque in excess of the EPA NTE torque requirement at any given speed, allowing the main engine to remain exactly at (or under) the EPA NTE limit at all times.

The hybrid propulsion and energy management systems of the present invention preferably incorporate sensors and monitoring devices that detect current power levels and operating parameters at various points within the system and communicate that data to a centralized control system operated, for example, by a programmed or programmable controller (PLC). Various types of control systems and interfaces may be provided. Discrete operator system controls may be provided in a separate control panel, for example, allowing the operator to select modes and bring propulsion systems on- and off-line at his discretion. Various types of human-machine interfaces may be provided. Industry standard OPC protocols may be used for connectivity to the PLC portion of the system and standard software development tools may be used for development of the interface. The system interface and controller may communicate with a remote or centralized control or monitoring system, so that remote connectivity and monitoring is available as an option.

In general, the vessel control systems preferably utilize a distributed control topology wherever practical. Control functions are pushed to the lowest possible control level. This provides a high immunity to control failures from a systems point of view. In one embodiment, the source(s) of speed and voltage control faults in a power plant are identified and the faults are cleared prior to producing a cascade failure. The propulsion control, supervisory power management and energy management may be carried out using 2×stand alone PLC based control systems. All critical control devices are preferably provided with high reliability, monitored redundant power supplies.

In one embodiment, a fixed monitoring and interface station is provided in the engine room and another at an operator control station, such as in the wheelhouse. A portable maintenance device, such as a laptop, may be provided and is able to connect to the system at any location, such as in the Z-drive compartment. As with the propulsion control, the system will be divided into two (2) standalone systems. Each operator station may interface with a dedicated server; one located in the wheelhouse and the other located in the engineering space, providing increased reliability through physical separation.

The design provides electrical power generation, distribution and propulsion system such that a single fault on an active element does not cause the vessel to lose more than 50% of its propulsion capabilities. Furthermore, in a preferred embodiment, the system is arranged so that the only single point failure for an active element that results in loss of 50% of the plant is the Z-drive gearbox. This represents a significant improvement over conventional vessel electrical and drive system designs, where main engine failures generally result in a 50% loss of propulsion. The distributed power plant design with multiple power options on each drive line means that most probable failures leave both shafts available to the operator.

The Energy Management System coordinates the performance of the generators, the distribution system and the power consumers. In many traditional Power Management Systems, the focus was on a high level control by a centralized system. Power management for the hybrid system of the present invention generally pushes control of the process to lowest level possible. In some embodiments, this means that wherever possible, intelligent loads recognize the plant load level directly through frequency and reduce consumption as appropriate.

The power management functions of a central control system generally include "high level" power allocation limits that are developed from multiple information sources. This new information, derived from process variables, is passed down to process controllers. The process controllers perform within the parameters delivered by the power central control system. These parameters can be updated within the bandwidth of the central control system. The process controllers will perform within the parameters delivered by the central control system until updated. The critical characteristic is that the parameters must not be required on a deterministic basis and autonomous and predictable performance can be expected from the process machine without continuous updates of the parameters.

The DC control power system is also provided as a redundant system. Two independent, highly redundant power systems are fitted to supply highly reliable power to critical system controller loads. Operator interface to this system may only be provided to carry out maintenance or to reconfigure the system for temporary common mode operation as a result of a failure in another part of the system. The system preferably monitors all layers of redundancy and provides detailed status back to the maintenance personnel. System summary status is available through a VMS/SWBD hardwired interface.

The present invention has been described with reference to specific device embodiments and figures. These specific embodiments should not be construed as limitations on the scope of the invention, but merely as illustrations of exemplary embodiments. It is further understood that many modifications, additions and substitutions may be made to the described hybrid propulsion and energy management systems without departing from the scope of the present invention.

We claim:

1. A propulsion system comprising: at least two energy sources capable of providing propulsion and an energy management system (EMS) that controls operation of each of the at least two sources, wherein the at least two sources include at least one main propulsive engine and at least one motor-generator unit arranged in-line to drive a common output shaft and linked to a common propulsive output member, wherein the common output shaft and propulsive output member are drivable both independently by the main propulsive engine and the motor-generator unit and simultaneously by the main propulsive engine and the motor-generator unit, wherein the main propulsive engine is capable of driving the common output shaft and driving the motor-generator unit as a generator both independently and simultaneously, and wherein the energy management system dynamically shifts operation of each of the at least two sources to satisfy propulsive demands.

2. A propulsion system of claim 1, wherein the motor-generator unit is linked to an electrical distribution system providing bi-directional energy flow between the motor-generator unit and the electrical distribution system under the control of the energy management system (EMS).

3. A propulsion system of claim 2, wherein the EMS controls operation of the motor-generator unit as a motor for propulsion and as a generator for supplying energy to the electrical distribution system.

4. A propulsion system of claim 2, wherein the electrical distribution system is additionally linked to at least one auxiliary generator that, during operation, supplies energy to the electrical distribution system.

5. A propulsion system of claim 2, wherein the electrical distribution system is additionally linked to an energy storage system providing bi-directional energy flow between the electrical distribution system and the energy storage system.

6. A propulsion system of claim 2, wherein the electrical distribution system comprises a DC bus.

7. A propulsion system of claim 6, wherein the electrical distribution system additionally comprises an AC bus linked to the DC bus providing bi-directional flow between DC and AC buses.

8. A propulsion system of claim 2, wherein the electrical distribution system comprises a DC bus and the EMS maintains substantially constant DC voltage on the DC bus during operation of the propulsion system and supplies energy in excess of that required to maintain constant DC voltage to the energy storage system.

9. A propulsion system of claim 1, wherein the propulsive output member is a propeller or a propulsion Z-drive.

10. A propulsion system of claim 2, additionally comprising a variable frequency drive linking the energy distribution system and the motor-generator unit and specifying the output speed and/or torque of the motor-generator unit.

11. A propulsion system of claim 1, comprising two main propulsive engines and two motor-generators, each main propulsive engine arranged to drive a common output shaft in combination with a motor-generator and linked to a common propulsive output member, whereby each common output shaft and propulsive output member are drivable both independently by the respective main propulsive engine and motor-generator and simultaneously by the respective main propulsive engine and the motor-generator.

12. A propulsion system of claim 1, wherein the EMS operates the main propulsive engine only in high efficiency modes of operation.

13. A propulsion system of claim 1, wherein the EMS controls operation of the main propulsive engine to limit the torque output of the main propulsive engine to a selected level.

14. A propulsion system of claim 13, wherein the EMS controls operation of the main propulsive engine to limit the torque output to a selected level at or below a not to exceed level specified by a regulatory agency.

15. A propulsion system of claim 13, wherein the EMS operates the motor-generator unit as a motor providing additional propulsive energy to the common output shaft and common propulsive member to satisfy propulsive demands when operation of the main propulsive engine fails to satisfy propulsive demands.

16. A propulsion system of claim 1, wherein the motor-generator unit is an AC motor-generator.

17. A propulsion system of claim 1, wherein the motor-generator unit is an AC squirrel cage induction motor.

18. A propulsion system of claim 2, additionally comprising at least one winch coupled to the energy distribution system, wherein the EMS controls energy supply to the winch from the energy distribution system.

19. A propulsion system of claim 18 wherein the at least one winch is coupled to the energy distribution system through a variable frequency drive system.

20. A propulsion system of claim 18, wherein the winch additionally supplies regenerative energy to the energy distribution system.

21. A vessel incorporating the propulsion system of claim 1.

22. A vessel of claim 18, wherein the vessel is a tugboat.

23. A hybrid power system for use on a marine vessel comprising at least two independently operable drive sources including at least one main propulsive engine and at least one motor-generator unit arranged on a common driveline, an energy distribution bus providing bi-directional energy flow to the at least one motor-generator unit, an energy storage system providing bi-directional energy flow to the energy distribution bus, and an energy management system (EMS) controlling operation of the at least two drive sources and controlling energy flow between the at least two drive sources, the energy distribution bus and the energy storage system, wherein: the at least one main propulsive engine and the at least one motor-generator unit are capable of providing output to the common drive line both independently of one another and simultaneously; the at least one main engine is operable to simultaneously provide propulsion to the driveline and energy to the energy distribution system; and the EMS dynamically operates the two independently operable drive sources and dynamically controls energy flow to satisfy propulsive demands.

24. A hybrid power system of claim 23, wherein the at least one motor-generator unit is additionally operable in a motor mode using energy from another independently operable drive source.

25. A hybrid power system of claim 23, additionally comprising at least one auxiliary generator providing energy to the energy distribution bus.

26. A hybrid power system of claim 23, additionally comprising at least one winch coupled to and drawing power from the energy distribution bus during operation of the system.

27. A hybrid power system of claim 26, wherein the at least one winch is coupled to and drawing power from the energy distribution bus through a variable frequency drive system.

28. A hybrid power system of claim 23, comprising two main engines, two motor-generators and two common drivelines, each main engine arranged on a common driveline with a motor-generator, wherein each common driveline is drivable both independently by the respective main engine and motor-generator and simultaneously by the respective main engine and motor-generator.

29. A vessel incorporating the hybrid power system of claim 23.

30. A vessel of claim 29, wherein the vessel is a tugboat.

* * * * *

UNITED STATES PATENT AND TRADEMARK OFFICE
CERTIFICATE OF CORRECTION

Page 1 of 1

PATENT NO. : 8,062,081 B2
APPLICATION NO. : 12/334412
DATED : November 22, 2011
INVENTOR(S) : John Barrett et al.

It is certified that error appears in the above-identified patent and that said Letters Patent is hereby corrected as shown below:

| Col. No. Line(s): | Item (73): |
|---|---|
| Title page Item (73) | Add Assignee: "Aspin Kemp and Associates, Owen Sound, ON (CA)" and "XeroPoint Energy, Pinette, PE (CA)" |

Signed and Sealed this
Seventeenth Day of April, 2012

David J. Kappos
*Director of the United States Patent and Trademark Office*